US012540336B2

(12) United States Patent
Medin et al.

(10) Patent No.: US 12,540,336 B2
(45) Date of Patent: Feb. 3, 2026

(54) LENTIVIRAL VECTOR TRANSFER PLASMID AND METHODS OF USE

(71) Applicant: The Medical College of Wisconsin, Inc., Milwaukee, WI (US)

(72) Inventors: Jeffrey A. Medin, Shorewood, WI (US); William M. McKillop, Wauwatosa, WI (US); Kristy J. Gargulak, Milwaukee, WI (US)

(73) Assignee: The Medical College of Wisconsin, Inc., Milwaukee, WI (US)

( * ) Notice: Subject to any disclaimer, the term of this patent is extended or adjusted under 35 U.S.C. 154(b) by 686 days.

(21) Appl. No.: 18/000,025

(22) PCT Filed: May 25, 2021

(86) PCT No.: PCT/US2021/033974
§ 371 (c)(1),
(2) Date: Nov. 28, 2022

(87) PCT Pub. No.: WO2021/242719
PCT Pub. Date: Dec. 2, 2021

(65) Prior Publication Data
US 2023/0220419 A1   Jul. 13, 2023

Related U.S. Application Data

(60) Provisional application No. 63/030,820, filed on May 27, 2020.

(51) Int. Cl.
*C12N 15/86* (2006.01)
*C12N 15/65* (2006.01)

(52) U.S. Cl.
CPC ............. *C12N 15/86* (2013.01); *C12N 15/65* (2013.01); *C12N 2740/16043* (2013.01)

(58) Field of Classification Search
None
See application file for complete search history.

(56) References Cited

U.S. PATENT DOCUMENTS

| 5,686,279 | A | 11/1997 | Finer et al. |
| 6,136,597 | A | 10/2000 | Hope et al. |
| 2003/0148522 | A1 | 8/2003 | Olsen |
| 2005/0251872 | A1* | 11/2005 | Bear ................. A01K 67/0275 435/235.1 |
| 2019/0276540 | A1 | 9/2019 | Baeuerle et al. |

FOREIGN PATENT DOCUMENTS

| WO | 2016044811 A1 | 3/2016 |
| WO | 2016090369 A1 | 6/2016 |

OTHER PUBLICATIONS

Altschul, S. et al., Gapped BLAST and PSI-BLAST: A New Generation of Protein Database Search Programs, Nucleic Acids Research, 1997, 25(17):3389-3402.

(Continued)

*Primary Examiner* — Tracy Vivlemore
*Assistant Examiner* — Hanna Marie Thueson
(74) *Attorney, Agent, or Firm* — Quarles & Brady LLP (57) ABSTRACT

The present invention provides an improved lentiviral backbone for use in gene therapy.

18 Claims, 3 Drawing Sheets

Specification includes a Sequence Listing.

(56) References Cited

OTHER PUBLICATIONS

Corbeau, P. et al., Efficient Gene Transfer by a Human Immunodeficiency Virus Type 1 (HIV-1)-derived Vector Utilizing a Stable HIV Packaging Cell Line, Proc. Natl. Acad. Sci. USA, 1996, 93:14070-14075.
Fowler, D. et al., Phase 2 Clinical Trial of Rapamycin-Resistant Donor CD4+ Th2/Th1 (T-Rapa) Cells After Low-Intensity Allogeneic Hematopoietic Cell Transplantation, Blood, 2013, 121(15):2864-2874.
Karlin, S. et al., Methods for Assessing the Statistical Significance of Molecular Sequence Features by Using General Scoring Schemes, Proc. Natl. Acad. Sci. USA, 1990, 87:2264-2268.
Naldini, L. et al., In Vivo Gene Delivery and Stable Transduction of Nondividing Cells by a Lentiviral Vector, Science, 1996, 272(5259):263-267.
Oldham, R. et al., Practical Considerations for Chimeric Antigen Receptor Design and Delivery, Expert Opinion on Biological Therapy, 2017, 17(8):961-978.
Ory, D. et al., A Stable Human-Derived Packaging Cell Line for Production of High Titer Retrovirus / Vesicular Stomatitis Virus G Pseudotypes, Proc. Natl. Acad. Sci. USA, 1996, 93:11400-11406.
Tiscornia, G. et al., Production and Purification of Lentiviral Vectors, Nature Protocols, 2006, 1(1):241-245.
PCT International Search Report and Written Opinion, PCT/US2021/033974, Sep. 21, 2021, 12 pages.
European Patent Office, Extended Search Report, Application No. 21812030.1, May 29, 2024, 8 pages.

\* cited by examiner

LENTIVIRAL VECTOR TRANSFER PLASMID AND METHODS OF USE

CROSS-RELATED APPLICATIONS

This application is the U.S. National Stage of PCT/US2021/033974 with international filing date of May 25, 2021, which claims priority to U.S. Provisional Application No. 63/030,820 filed on May 27, 2020, the contents of each of the above-referenced applications is incorporated by reference in its entirety.

STATEMENT REGARDING FEDERALLY SPONSORED RESEARCH

N/A

SEQUENCE LISTING

A Sequence Listing accompanies this application and is submitted as an ASCII text file of the sequence listing named "650053_00793_ST25.txt" which is 19 KB in size and was created on May 13, 2021. The sequence listing is electronically submitted via EFS-Web with the application and is incorporated herein by reference in its entirety.

INTRODUCTION

Gene therapy has been used successfully to treat a number of inherited disorders. Although many gene delivery systems exist, lentiviral vectors offer several advantages, including stable integration into host genomes, the ability to infect a wide variety of cell types including both dividing and non-dividing cells, and relatively high levels of transgene expression. Further, compared to other viruses, such as adenovirus, lentiviruses generate little immune response on their own.

Lentiviral-mediated gene therapy has immense potential for treating disorders caused by a deficiency in a single gene product. For example, many lysosomal storage disorders (LSD) fall into this category. In LSDs, lysosome dysfunction is usually caused by a deficiency in a single enzyme required for the intracellular digestion of lipids, glycoproteins or polysaccharides. As a result of the deficiency, molecules that would normally be degraded accumulate inside the cell, leading to dysfunction or death of the cell.

Lentiviral vectors are currently used in pre-clinical research, clinical trials, and FDA-approved commercial therapies. However, production issues continue to plague the field, especially at large-scale. For instance, low functional titers and contamination from source material are detrimental to virus efficacy. During clinical vector manufacturing, the more pure a viral preparation becomes, the lower the functional titer falls.

Many current lentiviral backbones utilize ampicillin resistance as a selection marker during plasmid production. While ampicillin resistance is one of the most commonly used selection markers for pre-clinical work, it poses several problems for clinical use. Plasmid stocks containing residual ampicillin can carry over that contamination to the clinical viral batch. Due to the high prevalence of beta-lactam antibiotic allergies in the general population, the U.S. FDA recommends not using ampicillin in clinical vector preparations.

Thus, there is a need in the art for improved lentiviral plasmid backbones that utilize alternative selection markers and that can be efficiently purified with high functional titers.

SUMMARY

The present invention provides a lentiviral vector that provides improved properties over the prior vectors.

In one aspect, the disclosure provides a lentiviral polynucleotide backbone having a sequence with at least 90% similarity to SEQ ID NO: 1, wherein the backbone comprises a multiple cloning site that allows for the insertion of a transgene of interest. In one aspect, the backbone comprising SEQ ID NO:1. In some aspects, the backbone can be used to generate a population of viral particles with increased viral titer as compared to a conventional lentiviral backbones.

In another aspect, the disclosure provides a viral particle comprising the lentiviral backbone described herein. In some aspects, the viral particle is packaged with increased efficiency as compared to those generated from a conventional lentiviral backbone.

In another aspect, the disclosure provides a lentiviral construct comprising a nucleic acid sequence encoding a transgene of interest inserted within the multiple cloning site of the lentiviral backbone described herein.

In another aspect, the disclosure provides a host cell comprising the lentiviral construct described herein and viral particles produced by the host cell comprising the lentiviral construct.

In a further aspect, the disclosure provides a composition comprising the viral particle described herein.

The foregoing and other aspects and advantages of the invention will appear from the following description. In the description, reference is made to the accompanying drawings which form a part hereof, and in which there are shown, by way of illustration, preferred embodiments of the invention. Such embodiments do not necessarily represent the full scope of the invention, however, and reference is made therefore to the claims and herein for interpreting the scope of the invention.

DETAILED DESCRIPTION

The present disclosure provides improved lentiviral backbones. As compared to existing lentiviral backbones, the backbones described herein produce higher viral titers by generating lentiviral particles that are packaged with greater efficiency. The lentiviral backbones have been designed to facilitate insertion of a therapeutic transgene into the backbone, forming lentiviral constructs (i.e., recombinant lentiviral plasmids) that may be packaged into viral particles in a host cell. The viral particles or host cells comprising these constructs may be formulated as a therapeutic composition and administered to a patient as a gene therapy.

Lentiviral Backbones:

The present invention provides improved lentiviral backbones having a sequence with at least 90% similarity to SEQ ID NO: 1. In some embodiments, the lentiviral backbone has a sequence with at least 90%, 91%, 92%, 93%, 94%, 95% 96% 97%, 98%, 99%, or 100% sequence similarity to SEQ ID NO:1. The backbones comprise a multiple cloning site that allows for the insertion of transgene(s) of interest. The disclosed backbones have been altered for enhanced viral production. These backbones use kanamycin resistance as a selection marker, as opposed to ampicillin resistance, to avoid problems associated with clinical ampicillin use. To address the issue of low functional titers, the backbones have a modified 5' long terminal repeat (LTR) and promoter for increased transgene expression. Further, the backbones were designed to be smaller than many existing backbones to facilitate increased lentiviral vector yields.

The terms "lentiviral backbone" and "lentiviral plasmid backbone" are used interchangeably herein to refer to a nucleic acid molecule comprising lentiviral genomic material that is capable of transporting another nucleic acid (e.g., a therapeutic transgene) to which it has been operably linked. Notably, while the term "vector" is commonly used to describe recombinant nucleic acid molecules of this nature, the term "vector" is also used to describe recombinant viruses that are used to deliver transgenes into cells. Thus, to avoid confusion, we use the terms "backbone," "plasmid," or "construct" when referring to the recombinant nucleic acid molecules disclosed herein and we use the term "vector" to refer to a lentivirus comprising these nucleic acid molecules. The lentiviral backbones of the present invention are integrated into the cellular genome upon transduction into a suitable host cell, and are thereby replicated along with the host genome. These backbones are recombinant "expression vectors," meaning they contain the necessary elements to direct the expression of genes to which they are operatively linked. Thus, when these lentiviral backbones are delivered into a cell via the lentiviral vectors, they may cause the cell to express the nucleic acids and/or proteins encoded by the backbone. Thus, in some embodiments, a "transgene of interest" is inserted within the multiple cloning site of these backbones, forming a "lentiviral construct." As used herein, a "multiple cloning site" (MCS) is a DNA sequence within a plasmid that contains multiple unique restriction enzyme cut sites. The MCS facilitates the insertion of DNA fragments into the lentiviral backbones via standard cloning techniques. For example, in the lentiviral backbones described herein, the MCS is located downstream of an Elongation Factor 1 alpha (EF1α) promoter from which transcription of any inserted transgene of interest initiates.

The improved lentiviral backbones of the present invention comprise several additional functional components. First, the backbones contain a kanamycin antibiotic resistance gene (KanR), which serves as a selectable marker during amplification in bacteria. The advantages of using kanamycin resistance rather than ampicillin resistance for selection are discussed above. Second, the backbones include a central polypurine tract (cPPT), which serves as a recognition site for proviral DNA synthesis. Inclusion of a cPPT in a backbone has been shown to increase nuclear transport and integration into the host cell genome, resulting in increased transduction efficiency and transgene expression. Third, the backbones comprise a Woodchuck Posttranscriptional Regulatory Element (WPRE) to enhance the level of transgene expression (discussed in detail below). Fourth, the backbones also comprise an internal ribosome entry site (IRES) sequence that permits the expression of multiple polypeptides from a single promoter.

Figure 1:
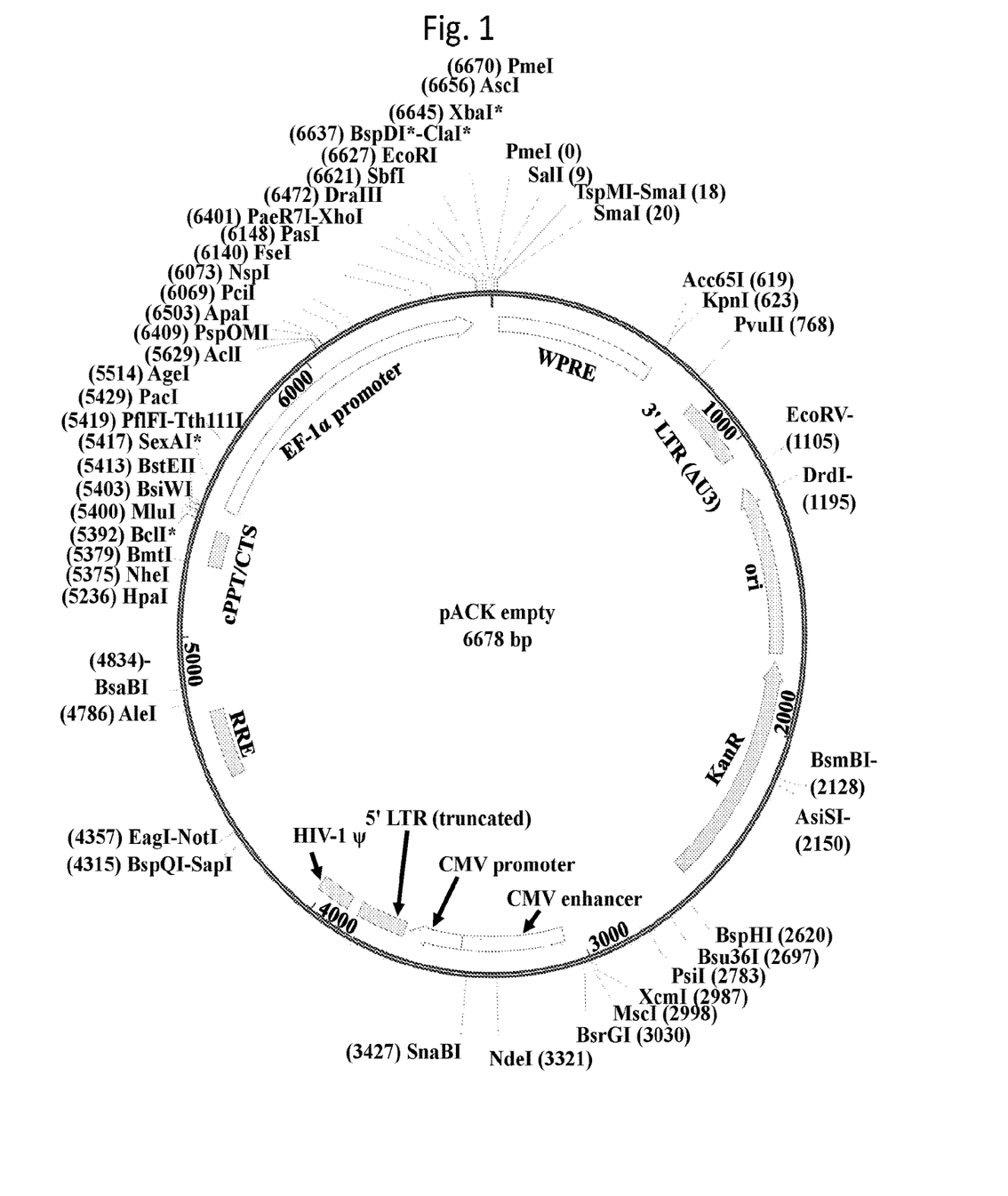
FIG. 1 shows a map of a lentiviral backbone of the present invention.

Additionally, the backbones comprise several sequences that are necessary for replication, encapsidation, and expression of any inserted transgenes. These sequences include: a pMB1 derivative (a plasmid origin of replication that facilitates replication within bacteria), a 3' SIN (a self-inactivating 3' HIV LTR), an SV40 origin (which allows for episomal amplification of plasmids in eukaryotic cells that express SV40 large-T antigen), a CMV IE-1 promoter (a chimeric 5' HIV LTR/CMV promoter hybrid), RU5 (a truncated 5' HIV LTR), Psi packaging element (HIV stem-loops 1-4 that regulate the packaging of the retroviral RNA genome into the viral capsid), a Rev Response Element (RRE; the sequence to which the Rev protein binds for viral replication), denvRF1/2 (fragments of the HIV envelope gene). A map of this backbone is shown in FIG. 1.

It is desirable for the lentiviral backbones of the present invention to contain an LTR region that has reduced promoter activity relative to a wild-type LTR, because such constructs provide a "self-inactivating" (SIN) biosafety feature. Self-inactivating plasmids are ones in which the expression of the full-length of the plasmid in transduced cells in greatly reduced or abolished altogether. This feature greatly minimizes the risk that replication-competent recombinants (RCRs) will emerge. Furthermore, it reduces the risk that that cellular coding sequences located adjacent to the plasmid integration site will be aberrantly expressed. Furthermore, a SIN design reduces the possibility of interference between the LTR and the promoter that is driving the expression of the transgene. It is, therefore, particularly suitable to reveal the full potential of the internal promoter.

Self-inactivation is preferably achieved through in the introduction of a deletion in the U3 region of the 3' LTR of the backbone DNA, i.e., the DNA used to produce the backbone RNA. Thus, during reverse transcription, this deletion is transferred to the 5' LTR of the proviral DNA. It is desirable to eliminate enough of the U3 sequence to greatly diminish or abolish altogether the transcriptional activity of the LTR, thereby greatly diminishing or abolishing the production of full-length plasmid RNA in transduced cells. However, it is generally desirable to retain those elements of the LTR that are involved in polyadenylation of the viral RNA, a function spread out over U3, R and U5. Thus, the LTR may be rendered about 90%, 91%, 92%, 93%, 94%, 95% 96% 97%, 98%, to about 99% transcriptionally inactive.

As noted above, the lentiviral backbones described herein contain a Woodchuck Posttranscriptional Regulatory Element (WPRE) from the woodchuck hepatitis virus, a post-transcriptional regulatory element which does not rely on splicing events. This regulatory element is positioned within the backbone so as to be included in the RNA transcript of the transgene, but outside of stop codon of the transgene translational unit. The WPRE is characterized and described in U.S. Pat. No. 6,136,597, incorporated herein by reference. As described therein, the WPRE is an RNA export element that mediates efficient transport of RNA from the nucleus to the cytoplasm. It enhances the expression of transgenes by insertion of a cis-acting nucleic acid sequence, such that the element and the transgene are contained within a single transcript. Presence of the WPRE in the sense orientation was shown to increase transgene expression by up to 7 to 10 fold. Retroviral vectors transfer sequences in the form of cDNAs instead of complete intron-containing genes as introns are generally spliced out during the sequence of events leading to the formation of the retroviral particle. Introns mediate the interaction of primary transcripts with the splicing machinery. Because the processing of RNAs by the splicing machinery facilitates their cytoplasmic export, due to a coupling between the splicing and transport machineries, cDNAs are often inefficiently expressed. Thus, the inclusion of the WPRE in a backbone results in enhanced expression of transgenes.

In some embodiments, the lentiviral backbones of the present invention further comprise sequences that provide additional functions. Suitable sequences include those encoding a self-cleaving peptide (e.g., T2A), suicide gene (e.g., tmpK, HSV-1-tk), fluorescent protein (e.g., eGFP, RFP), or cell surface marker (e.g., CD25, LNGFR), among others. One skilled in the art can provide a suitable additional functional sequences to be included.

The present invention also provides nucleic acid sequences that share sequence identity with the lentiviral backbone of SEQ ID NO:1. In one embodiment, the nucleic acid sequence has 90-95%, 95-99% or 99-99.9% sequence identity of SEQ ID NO:1.

"Percentage of sequence identity" or "sequence similarity" is determined by comparing two optimally aligned sequences over a comparison window, wherein the portion of the polynucleotide sequence in the comparison window may comprise substitutions, or additions or deletions (i.e., gaps) as compared to the reference sequence (which does not comprise substitutions, additions or deletions) for optimal alignment of the two sequences. The percentage is calculated by determining the number of positions at which the identical nucleic acid base or amino acid residue occurs in both sequences to yield the number of matched positions, dividing the number of matched positions by the total number of positions in the window of comparison and multiplying the result by 100 to yield the percentage of sequence identity. Protein and nucleic acid sequence identities are evaluated using the Basic Local Alignment Search Tool ("BLAST"), which is well known in the art (Karlin and Altschul, 1990, *Proc. Natl. Acad. Sci. USA* 87: 2267-2268; Altschul et al., 1997, *Nucl. Acids Res.* 25: 3389-3402). The BLAST programs identify homologous sequences by identifying similar segments, which are referred to herein as "high-scoring segment pairs," between a query amino or nucleic acid sequence and a test sequence which is preferably obtained from a protein or nucleic acid sequence database. Preferably, the statistical significance of a high-scoring segment pair is evaluated using the statistical significance formula (Karlin and Altschul, 1990), the disclosure of which is incorporated by reference in its entirety. The BLAST programs can be used with the default parameters or with modified parameters provided by the user. The term "substantial identity" of amino acid sequences for purposes of this invention normally means polypeptide sequence identity of at least 90%. Preferred percent identity of polynucleotides can be any integer from 90% to 100%. More preferred embodiments include at least 90%, 91%, 92%, 93%, 94%, 95%, 96%, 97%, 98%, 99%, or 100%.

Transgenes:

In some embodiments, the lentiviral backbones of the present invention further comprise a transgene of interest, forming a lentiviral construct. The transgene of interest may be any gene. The lentiviral backbone may be used to introduce a novel transgene into a host cell. This is accomplished by inserting a sense polynucleotide comprising the transgene of interest into the lentiviral backbone. Alternatively, the lentiviral backbone may be used to insert a transgene that encodes a regulatory element that upregulates the expression of a native gene or to insert a transgene that encodes an antisense or siRNA polynucleotide sequence that downregulates the expression of a native gene. Techniques for inserting sense and antisense sequences of genes (or fragments thereof) are apparent to those skilled in the art. The transgene of interest may be isolated from a native source or synthesized, and may optionally be mutated.

The transgene of interest may be a "therapeutic transgene" that encodes a protein or enzyme that is associated with a disease or disorder. Alternatively, the transgene of interest may encode an antibody (e.g., ScFv, mAb, etc.) or siRNA designed to target a protein or enzyme that is associated with a disease or disorder.

In preferred embodiments, the transgene of interest will confer a desirable function to transduced cells. Suitable transgenes include, but are not limited to, for example, globin genes, hematopoietic growth factors, which include erythropoietin (EPO), the interleukins (such as Interleukin-1 (IL-1), Interleukin-2 (IL-2), Interleukin-3 (IL-3), Interleukin-6 (IL-6), Interleukin-12 (IL-12), etc.) and the colony-stimulating factors (such as granulocyte colony-stimulating factor, granulocyte/macrophage colony-stimulating factor, or stem-cell colony-stimulating factor), the platelet-specific integrin αIIbβ, multidrug resistance genes, the gp91 or gp47 genes that are defective in patients with chronic granulomatous disease (CGD), antiviral genes rendering cells resistant to infections with pathogens such as human immunodeficiency virus, genes coding for blood coagulation factors VIII or IX which are mutated in hemophiliacs, genes lacking in monogeneic diseases such as acid alfa glucosidase, alpha-galactosidase A, acid ceramidase, and glucocerebrosidase, ligands involved in T cell-mediated immune responses such as T cell antigen receptors, B cell antigen receptors (immunoglobulins) as well as combination of T and B cell antigen receptors alone or in combination with single chain antibodies such as ScFv, chimeric antigen receptors (CARS), tumor necrosis factor (TNF), gamma interferon, CTLA4, B7 and the like, genes expressed in tumor cells such as Melana, MAGE genes (such as MAGE-1, MAGE-3), P198, P1A, gp100 etc.

In some embodiments, the lentiviral constructs described herein comprise a transgene that is used to treat a genetic disorder associated with a deficiency in that gene. Exemplary genetic disorders that may be treated using the lentiviral constructs described herein include, but are not limited to, sickle cell anemia, thalassemias, hemaglobinopathies, Glanzmann thrombasthenia, lysosomal storage disorders (such as Fabry disease, Gaucher disease, Niemann-Pick disease, and Pompe disease), severe combined immunodeficiency syndromes (SCID), as well as diseases resulting from the lack of systemic production of a secreted protein, for example, coagulation factor VIII and/or IX Any of the transgenes listed herein may be used to treat their corresponding genetic disorder.

Lentiviral-mediated gene therapy has immense potential for treating disorders caused by a deficiency in a single gene product. This is accomplished by using the lentiviral vector to provide cells with a transgene that is able to compensate for the deficiency. For example, many lysosomal storage disorders (LSD) are caused by a deficiency of a single gene product and are contemplated to be treated using a lentiviral vector described herein. LSD are a group of more than 60 rare inherited metabolic disorders that result from lysosome dysfunction, usually as a consequence of a deficiency in a single enzyme required for the intracellular digestion of lipids, glycoproteins or polysaccharides. Because of such deficiencies, molecules that would normally be degraded accumulate inside the cell, leading to dysfunction or death of the cell. Exemplary LSDs include Fabry disease (Online Mendelian Inheritance in Man (OMIM) ID #301500, Gaucher disease (OMIM ID #230800, 230900, 231000, 231005), Farber disease (OMIM ID #228000), and Pompe disease (OMIM ID #232300). Suitable transgenes of interest will depend on the lysosomal storage disorder being treated. For example, a suitable transgene may be the enzymes α-gal A (SEQ ID NO:2) for Fabry disease, beta-glucocerebrosidase (GBA, β-Glucocerebrosidase, acid β-glucosidase, D-glucosyl-N-acylsphingosine glucohydrolase, or GCase, which can be used interchangeably, SEQ ID NO:3) for Gaucher disease, acid ceramidase (encoded by the ASAH1 transgene, SEQ ID NO:4) for Farber disease, and acid α-glucosidase (encoded by GAA transgene, also known as acid maltase, SEQ ID NO:5) for Pompe disease.

Fabry disease is an X-linked LSD resulting from a deficiency in the enzyme α-galactosidase A (α-gal A, encoded by the AGA transgene), an enzyme that hydrolyses α-galactose from glycosphingolipids. In previous work, the inventors disclosed methods of treating Fabry disease using lentiviral vectors to transform hematopoietic cells or CD4+ T cells with α-gal A for treatment systemically. Thus, the lentiviral backbone disclosed herein can be used for the expression of α-galactosidase A to ameliorate Fabry disease as understood in the art.

In addition to those described, many additional transgenes are contemplated for use with the lentiviral backbone of the present invention.

Virus Particles:

To use the lentiviral backbones of the present invention to drive transgene expression for gene therapy applications, recombinant lentiviral particles must first be produced in vitro. For safety purposes, the lentiviral backbone comprises a highly deleted viral genome. All open reading frames have been removed from this viral genome such that it is incapable of replication on its own, while all the sequences required for replication, encapsidation, and expression are maintained. Thus, to generate viral particles for use in gene therapy, the lentiviral backbones and constructs of the present invention must be introduced into a packaging cell along with viral packaging constructs (i.e., plasmids expressing Gag-Pol precursors and Rev) and a viral envelope protein. The packaging cell then produces viral particles that contain the lentiviral backbones or constructs.

The env gene can be derived from any virus, including retroviruses. The env preferably is an amphotropic envelope protein which allows transduction of cells of human and other species. Examples of retroviral-derived env genes include, but are not limited to: Moloney murine leukemia virus (MoMuLV or MMLV), Harvey murine sarcoma virus (HaMuSV or HSV), murine mammary tumor virus (MuMTV or MMTV), gibbon ape leukemia virus (GaLV or GALV), human immunodeficiency virus (HIV) and Rous sarcoma virus (RSV). Other env genes such as Vesicular stomatitis virus (VSV) protein G (VSV-g) or that of hepatitis viruses and of influenza (e.g., hemagglutinin) also can be used.

VSV-g protein is a desirable env gene because VSV-g confers broad host range on the recombinant virus, VSV-g can be deleterious to the host cell. Thus, when a gene such as that for VSV-g is used, it is preferred to employ an inducible promoter system so that VSV-g expression can be regulated to minimize host toxicity when VSV-g expression is not required. For example, the tetracycline-regulatable gene expression system of Gossen & Bujard, (1992) can be employed to provide for inducible expression of VSV-g when tetracycline is withdrawn from the transferred cell. In this case, the tet/VP16 transactivator is present on a first plasmid and the VSV-g coding sequence is cloned downstream from a promoter controlled by tet operator sequences on another plasmid.

The lentiviral backbones or constructs are introduced into a packaging cell line via transfection or infection. Methods for transfection or infection are well known by those of skill in the art. After co-transfection of the packaging plasmids and the transfer plasmid to the packaging cell line, the recombinant virus is recovered from the culture media and tittered by standard methods used by those of skill in the art. Thus, the packaging constructs can be introduced into human cell lines by calcium phosphate transfection, lipofection or electroporation, generally together with a dominant selectable marker, such as neomycin, DHFR, Glutamine synthetase or ADA, followed by selection in the presence of the appropriate drug and isolation of clones. The selectable marker gene can be linked physically to the packaging genes in the construct.

Stable packaging cell lines that comprise necessary components to generate viral particles are known. For example, see U.S. Pat. No. 5,686,279; and Ory et al., (1996), which describe packaging cells. Introducing a lentiviral backbone or construct into the packaging cells makes them virus producer cells. Producer cells are thus cells or cell-lines that can produce or release packaged infectious viral particles carrying the therapeutic gene of interest. These cells can further be anchorage dependent which means that these cells will grow, survive, or maintain function optimally when attached to a surface such as glass or plastic. Suitable packaging cells include, but are not limited to, tissue culture cells, stem cells, and neoplastically transformed cells. Exemplary packaging cell lines include HEK293, HeLa, 911, pTG6559, GH329, N52.E6, UR, VLI-293b, PERC.6 cells, and other cell lines derived from these commonly used lines.

In some applications, particularly when the virus is to be used for gene therapy applications, it is preferable that the backbone be replication deficient (or replication defective) to avoid uncontrolled proliferation of the virus in the individual to be treated. In such instances mammalian cell lines are selected which have been engineered, either by modification of the producer cell's genome to encode essential viral functions or by the co-infection of the producer cell with a helper virus, to express proteins complementing the effect of the sequences deleted from the viral genome. For example, for HIV-1 derived vectors, the HIV-1 packaging cell line, PSI422, may be used as described in Corbeau, et al. (1996). Similarly, where the viral vector to be produced is a retrovirus, the human HEK293-derived retroviral packaging cell line (293GPG) capable of producing high titers of retroviral particles may be employed as described in Ory, et al. (1996). In the production of minimal vector systems, the producer cell is engineered (either by modification of the viral genome or by the use of helper virus or cosmid) to complement the functions of the parent virus enabling replication and packaging into virions in the producer cell line.

Host Cell

The recombinant lentiviral constructs may be subsequently used to transduce a host cell in which the lentiviral construct is integrated into the host cell genome via viral particles (i.e. viral vector). Viral particle mediated transduction can occur in vitro, followed by introduction of transduced cells into a patient, for example, by intravenous injection or transfusion. Alternatively, the lentiviral construct may be transduced into the cell in vivo within the patient or subject to be treated by direct injection of viral particles comprising the construct.

In vitro derived cells harboring the lentiviral constructs of the present invention can also be stored for later use (e.g., cryopreserved at −80° C. until thawed for further use). Suitable methods of cryopreserving and storing cells are known in the art, and suitable storage buffer medium are also well known and understood in the art. For example, stored cells may be infused into a patient at a later date to boost in vivo circulating transgene-producing cells.

Suitable cell types for gene delivery include, for example, hematopoietic stem cells, adherent and non-adherent bone marrow cells, circulating blood cells including cancer cells, peripheral blood mononuclear cells including dendritic cells, T-cells, where the T cells are optionally CD4 positive, CD8 positive, CD4/CD8 double positive, or CD4/CD8 double negative, B-cells, and NK-cells, among others.

T-cells are natural protein-secreting machines and are already employed in many clinical trials. T-cells can be obtained from peripheral blood (PB) and can be expanded exponentially in culture. In some cases, it may be advantageous to manufacture a mixed population of $CD4^+$ and $CD8^+$ T-cells that secrete the therapeutic protein (transgene of interest). Further, it may be advantageous to manufacture T-cell skewed towards a particular phenotype such as Th1, Th2, Th17, or a regulatory T-cell subset. Further embodiments include ex vivo treatment with rapamycin to produce T-cells (e.g., CD4+ T-cells) with a pro-engraftment and anti-apoptotic phenotype, termed "T-Rapa cells". Methods of conditioning T-cells to form T-Rapa cells are known in the art and are described in Fowler et al. (Blood (2013) 11: 121 (15):2864-2874), the contents of which are incorporated by reference in its entirety. T cells, and potentially other immune cells, can also be engineered to recognize specific proteins by transduction with vectors expressing chimeric antigen receptors (CARs). These engineered receptors combine both antigen-recognition and immune cell activating functions into a single chimeric receptor. CAR-T cell immunotherapy uses T cells engineered to express CARs to attack a patient's tumor. Autologous T cells harvested from the patient, or allogeneic T cells from another healthy donor can be used. Once modified by viral vector to express a specific CAR, it is hoped these cells will target a specific antigen present on the surface of tumors, and will thus be effective at clearing cancerous cells. Practical considerations for chimeric antigen receptor design and delivery are explored in the article Oldham et al. (Expert Opinion in Biological Therapy (2017) August; 17(8):961-78).

Suitable methods of obtaining T-cells (e.g., $CD4^+$ T-cells) from a subject are known in the art including standard outpatient blood draws or apheresis. In one embodiment, obtaining T-cells comprises detecting and isolating $CD4^+$ T-cells from a peripheral blood sample of a subject or suitable donor. Suitable methods of detecting and isolating $CD4^+$ T-cells from peripheral blood are known in the art and include, but are not limited to, for example, flow cytometric cell sorting, including fluorescence-activated cell sorting (FACS), or magnetic separation with the use of magnetic beads that recognize T-cells, including magnet-assisted cell sorting (MACS). In some embodiments, antibodies specific to CD4 (e.g., antibodies attached to magnetic beads) are used to separate $CD4^+$ T-cells from other cells found in peripheral blood. Alternatively, negative selection can be used to deplete the $CD4^-$ cells, allowing for the enrichment of $CD4^+$ cells. In some embodiments, the isolated $CD4^+$ T-cells used in the methods are at least about 70% $CD4^+$ (70% pure), more preferably at least about 75% $CD4^+$ (75% pure), alternatively at least about 80% $CD4^+$ (80% pure), alternatively at least about 85% (85% pure), at least about 90% $CD4^+$ (90% pure), at least about 95% $CD4^+$ (95% pure).

In other embodiments, the lentiviral backbones of the present invention may be used to produce human hematopoietic stem cells expressing a protein or enzyme of interest. Method of producing the human hematopoietic stem cell comprising the transgene include the steps of contacting a population of human cells that include hematopoietic stem cells with one of the lentiviral virus particles disclosed herein under conditions to effect the transduction of a human hematopoietic progenitor cell in said population by the construct. The stem cells may be transduced in vivo or in vitro, depending on the ultimate application. Even in the context of human gene therapy, such as gene therapy of human stem cells, one may transduce the stem cell in vivo or, alternatively, transduce in vitro followed by infusion of the transduced stem cell into a human subject. In one aspect of this embodiment, the human stem cell can be removed from a human, e.g., a human patient, using methods well known to those of skill in the art and transduced as noted above. The transduced stem cells are then reintroduced into the same or a different human.

Hematopoietic stem cells (HSCs) are "multipotent" cells residing in bone marrow that can ultimately differentiate into all blood cell types. HSCs are characterized by their expression of a cell surface glycoprotein called CD34. Accordingly, such cells are sometimes referred to as CD34+ hematopoietic cells, or CD34+ HSCs. In previous work, the inventors have genetically modified HSCs harvested from Fabry patients to produce α-gal A, the enzyme deficient in patients with Fabry disease. This is achieved by transducing CD34+ HSCs ex vivo with a recombinant lentivirus (LV) engineered to overexpress α-gal A. The modified HSCs are infused back into the same patients (autologous grafts), after they have been "conditioned" by drug regimens to ablate the endogenous HSCs in order to improve the success of the therapy. Upon re-introduction back into the patient, the genetically modified HSCs will populate all downstream lineages of the hematopoietic system and then circulate throughout the body.

Suitable methods of administering the transduced cells are known in the art, and include, but are not limited to, intravenous injection and transfusion. The transduced cells may be administered at least once, and suitably will be administered at subsequent times at which increased expression of the enzyme or protein of interest (are needed to treat one or more symptom of the disease being treated. A skilled artisan familiar with the disorder will appreciate monitoring protein production and the necessity for additional administrations.

When cells, for instance $CD34^+$ cells, dendritic cells, peripheral blood cells or tumor cells are transduced ex vivo, the viral particles are incubated with the cells using a dose generally in the order of between 1 to 100 multiplicities of infection (MOI), which also corresponds to $1\times10^5$ to $100\times 10^5$ units of the viral vector per $10^5$ cells. This of course includes amount of vector corresponding to 1, 2, 3, 4, 5, 6, 7, 8, 9, 10, 15, 20, 25, 30, 35, 40, 45, 50, 55, 60, 65, 70, 75, 80, 85, 90, 95, or 100 MOI. For example, transducing $1\times10^5$ cells at an MOI of 50 would require 50 times as much vector as the number of cells to be transduced, in this case a total of $5\times10^6$ vector particles. Typically, the amount of vector used in the MOI calculation may be expressed in terms of transducing units (TU), the particles ability to functionally transduce HeLa or HEK293T cells, or in terms of p24 capsid protein units. To perform the transduction, the cells may be exposed to the lentivirus for 10-24 hours, suitably about 12-16 hours. Cytokines may be added to the culture medium during transduction. After transduction, the cells can be either transferred back into the patient or cryopreserved for later transplantation, or a combination of both. In some instances, the transduced cells may be cultured for a number of days before being transferred or cryopreserved. Suitable methods of cryopreservation are known in the art.

Where a human subject is treated by introduction of the recombinant lentivirus directly into the subject, the treatment may be carried out by intravenous injection into the blood or into a specific organ. Suitable routes for lentiviral vector administration include intrarterially, endoscopically, intralesionally, percutaneously, subcutaneously, intramuscular, intrathecally, intraorbitally, intradermally, intraperitoneally, transtracheally, subcuticularly, by intrastemal injection, by inhalation or intranasal spraying, by endotracheal route and the like. In embodiments in which the lentiviral vectors are used as cancer therapies, the expression the vector can be delivered by direct injection into a tumor or into the tumor vasculature. For example, intraportal injection of a viral particle comprising a construct that expresses coagulation factor VIII for the correction of hemophilia A is envisioned. In yet another example, intravenous or intramuscular injection of viral particles of the present invention expressing the dystrophin gene for the treatment of Duchenne Muscular Dystrophy is envisioned. Thus, one of ordinary skill in the art will appreciate that the viral particles of the present invention may be used for a wide variety of gene therapies.

In some embodiments, transduced cells or recombinant lentivirus are administered to the subject with a pharmaceutically acceptable carrier or excipient. A "pharmaceutically acceptable carrier" is any conventional pharmaceutically acceptable carrier, vehicle, or excipient that is used in the art for production and administration of compositions to a subject. Suitable carriers are described, for example in Remington's Pharmaceutical Sciences (Remington's Pharmaceutical Sciences, Mack Publishing Company, Easton, Pa., USA). On this basis, the pharmaceutical compositions could include an active substance, such as a lentiviral construct or lentiviral particles, in association with one or more pharmaceutically acceptable carriers, vehicles, or diluents, and contained in buffered solutions with a suitable pH and iso-osmotic with the physiological fluids. Pharmaceutically acceptable carriers are typically non-toxic, inert, solid or liquid carriers that are physiologically balanced. Typically, buffered saline or other saline solutions are physiologically acceptable carriers. Water is not contemplated as a suitable physiologically acceptable carrier. In some embodiments, additional components may be added to preserve the structure and function of very particular cells, such as the T-Rapa cells of the present invention, but are physiologically acceptable for administration to a subject. The methods of combining the lentiviral construct or lentiviral particles with the carriers is well known to those skilled in the art. The composition could also include a targeting agent for the transport of the active compound to specified sites within cells.

Method of treating a subject in need thereof are contemplated using the lentiviral vectors or transduced cells described herein in order to express the transgene of interest.

The term "subject" and "patient" as used herein includes all members of the animal kingdom including mammals, suitably humans. Suitable subjects may have a disease or disorder, specifically a disease or disorder that can be treated by a protein or enzyme of interest, as described herein.

The term "treating" or "treatment" as used herein means administering to a subject a therapeutically effective amount of the lentiviral particles or host cells comprising a lentiviral construct of the present invention and may consist of a single administration, or alternatively comprise a series of applications. For example, the lentiviral particles or host cells may be administered at least once a week. However, in another embodiment, the lentiviral particles or host cells may be administered to the subject from about one time per week to about once daily for a given treatment. The length of the treatment period depends on a variety of factors, such as the severity of the disease, the age of the patient, the concentration and the activity of the lentiviral particles or host cells, or a combination thereof. In one embodiment, the treatment is chronic treatment and the length of treatment is 1-2 weeks, 2-4 weeks or more than 4 weeks. The treatment regimen can include repeated treatment schedules. It will also be appreciated that the effective amount or dosage of the lentiviral particles or host cells used for the treatment or prophylaxis may increase or decrease over the course of a particular treatment or prophylaxis regime. Changes in dosage may result and become apparent by standard diagnostic assays known in the art. In some instances, chronic administration may be required.

As used herein, and as well understood in the art, "treatment" or "treating" is also an approach for obtaining beneficial or desired results, including clinical results. Beneficial or desired clinical results can include, but are not limited to, alleviation or amelioration of one or more symptoms or conditions, diminishment of extent of disease, stabilized (i.e., not worsening) state of disease, preventing spread of disease, delay or slowing of disease progression, amelioration or palliation of the disease state, and remission (whether partial or total), whether detectable or undetectable. "Treatment" can also mean prolonging survival as compared to expected survival if not receiving treatment. Further, any of the treatment methods or uses described herein can be formulated alone or for contemporaneous administration with other agents or therapies.

As used herein, the phrase "effective amount" or "therapeutically effective amount" or a "sufficient amount" of a lentiviral particle, host cell, or composition of the present application is a quantity sufficient to, when administered to the subject, effect beneficial or desired results, including clinical results, and, as such, an "effective amount" or synonym thereto depends upon the context in which it is being applied. The amount of the lentiviral particle or host cell given should be varied depending upon various factors, such as the pharmaceutical formulation, the route of administration, the type of disease or disorder, the identity of the subject (e.g., age, sex, weight) or host being treated, and the like, but can nevertheless be routinely determined by one skilled in the art. Also, as used herein, a "therapeutically effective amount" of a lentiviral particle or host cell of the present disclosure is an amount, which results in a beneficial or desired result in a subject as compared to a control. As defined herein, a therapeutically effective amount of a compound of the present disclosure may be readily determined by one of ordinary skill by routine methods known in the art. Dosage regime may be adjusted to provide the optimum therapeutic response.

The term "antibody" as used herein is intended to include monoclonal antibodies, polyclonal antibodies, and chimeric antibodies which may be encoded within the lentiviral constructs described herein. The term "antibody fragment" as used herein is intended to include without limitations Fab, Fab', F(ab')2, scFv, dsFv, ds-scFv, dimers, minibodies, diabodies, and multimers thereof, multispecific antibody fragments and Domain Antibodies. Fab, Fab' and F(ab')2, scFv, dsFv, ds-scFv, dimers, minibodies, diabodies, bispecific antibody fragments and other fragments can also be encoded and expressed by the lentiviral constructs described herein.

The present invention has been described in terms of one or more preferred embodiments, and it should be appreciated that many equivalents, alternatives, variations, and modifications, aside from those expressly stated, are possible and within the scope of the invention.

It should be apparent to those skilled in the art that many additional modifications beside those already described are possible without departing from the inventive concepts. In interpreting this disclosure, all terms should be interpreted in the broadest possible manner consistent with the context. Variations of the term "comprising" should be interpreted as referring to elements, components, or steps in a non-exclusive manner, so the referenced elements, components, or steps may be combined with other elements, components, or steps that are not expressly referenced. Embodiments referenced as "comprising" certain elements are also contemplated as "consisting essentially of" and "consisting of" those elements. In places where ranges of values are given, this disclosure explicitly contemplates other combinations of the lower and upper limits of those ranges that are not explicitly recited. For example, recitation of a value between 1 and 10 or between 2 and 9 also contemplates a value between 1 and 9 or between 2 and 10. Ranges identified as being "between" two values are inclusive of the end-point values. For example, recitation of a value between 1 and 10 includes the values 1 and 10.

Aspects of the present disclosure that are described with respect to methods can be utilized in the context of the compositions of matter or kits discussed in this disclosure. Similarly, aspects of the present disclosure that are described with respect to compositions of matter can be utilized in the context of the methods and kits, and aspects of the present disclosure that are described with respect to kits can be utilized in the context of the methods and compositions of matter.

The invention will be more fully understood upon consideration of the following non-limiting examples.

EXAMPLES

Figure 2:
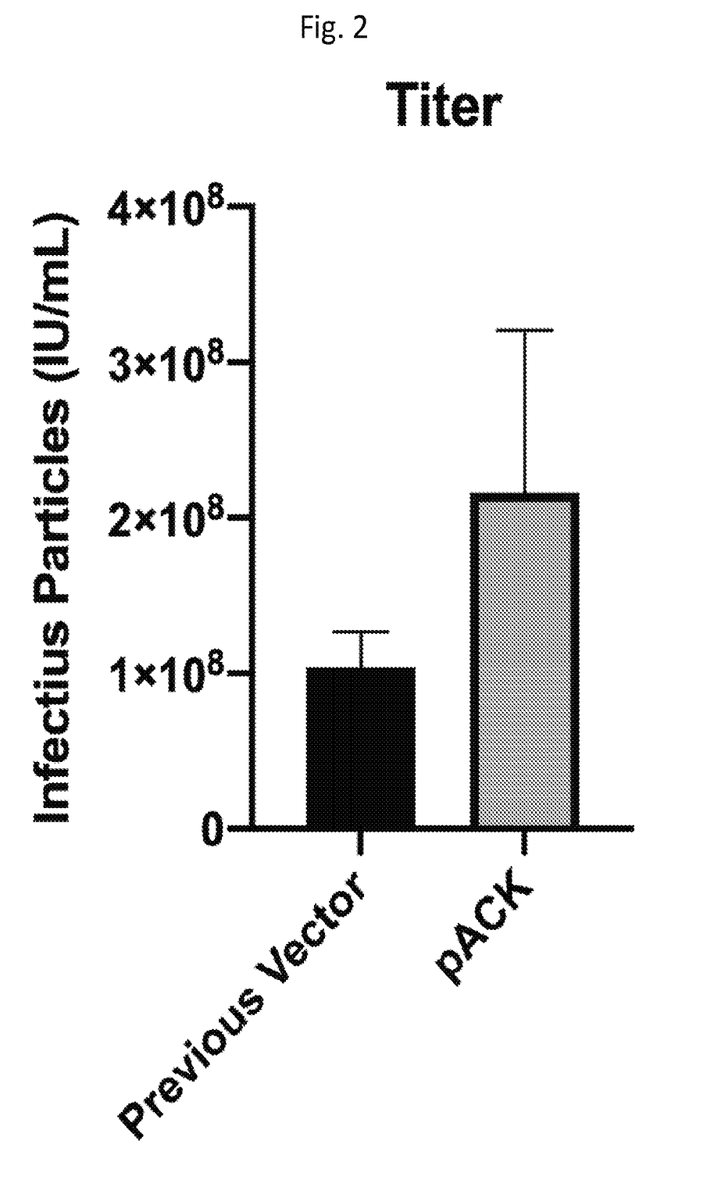
FIG. 2 is a graph depicting the increased viral titer generated using a lentiviral backbone of the present invention as compared to traditional lentiviral backbones based on the original pHR' lentiviral vector described by Naldini et al. (Science (1996b) 272(5259):263-7).

This Example demonstrates that the new pACK lentiviral backbone of the present invention (FIG. 1) generates viral vectors with improved titer (FIG. 2) and packaging efficiency (FIG. 3) as compared to previously disclosed backbones.

Protocol for Producing Viral Particles:

The following protocol is for producing viral particles from the lentiviral backbones and constructs of the present invention. Suitable methods of viral production are also known in the art (see, e.g., Tiscornia et al. Nature Protocols, Vol. 1, No. 1, 2006, p241).

Day 1: Seeding Cells

Prepare 150 mm cell culture dishes with $10 \times 10^6$ cells per plate in DMEM supplemented with 10% FBS, 1% Glutamax, and 1% penicillin-streptomycin (17 mL final volume). This equates to passaging one fully confluent plate into five plates.

Day 2: Transfection

1. Cells should be 50-70% confluent at this point. Thaw the plasmids for transfection. The plasmid required will depend on the choice of packaging system, i.e., whether it is second or third generation. Both second and third generation packaging systems require the improved lentiviral backbones described herein, as well as a viral envelope expressing plasmid (e.g., pCMVΔR8.91) to produce virus. A second-generation system will further require expression of the viral genes gag, pol, rev, and tat, which can be expressed from a single packaging plasmid such as pMDG. A third-generation system will further require expression of gag and pol from a packaging plasmid, such as pMDLg/pRRE, and rev from another, such as pRSV-Rev.

2. Prepare a DNA mixture by aliquoting the required plasmids into a tube at suitable amounts for transfection. Required plasmids depend on your desired lentiviral system. As discussed above, the plasmid backbones described herein can be packaged with either a second or third generation system. For second generation packaging we use a total plasmid density of 0.2-1 µg/cm² of cell growth surface area, specifically we use the plasmid backbones described herein between 0.07-0.46 µg of DNA/cm², pCMV at 0.07-0.46 µg of DNA/cm², and pMDG at 0.01-0.09 µg of DNA/cm². For third generation packaging we use a total plasmid density of 0.2-0.8 µg/cm² of cell growth surface area, specifically we use the plasmid backbones described herein at 0.01-0.06 µg of DNA/cm², pMDLg/pRRE at 0.05-0.28 µg of DNA/cm², pRSV/REV at 0.05-0.28 µg of DNA/cm², and pMD2.G at 0.03-0.18 µg of DNA/cm². Dissolve plasmids in 150 mM NaCl.

3. Prepare the transfection reagent mixture in a second tube. Mix 10 mM Polyethylenimine (PEI) with 150 mM NaCl.

4. Shake the two tubes vigorously for 1 minute to ensure good mixing.

5. Add the PEI transfection reagent mixture dropwise to the DNA mixture. Gently mix the DNA solution as you are adding the PEI. The mixture should turn cloudy.

6. Gently shake the transfection solution and let sit undisturbed at room temperature for 15-20 minutes.

7. Add 2.25 mL of the transfection solution dropwise to each 150 mm plate and rock the plate gently.

8. Incubate the cells for 12-17 hours at 37° C. and 5% CO2.

Day 3: Media Change

9. Change the media on the plates to 17 mL DMEM+5% FBS+PSQ and place back into the incubator. NOTE: make sure to do this within 17 hours. The first viral release occurs around 18 hours post-transfection.

Day 4: First Harvest

10. The next day (24 hours after media change), filter the media on the plates through a 0.22 µm Stericup filter and replace with 17 mL DMEM+5% FBS+PSQ. Put the plates back into the incubators and place the filtered supernatant at 4° C.

Day 5: Second Harvest and Concentrating Lentiviral Particles

11. Collect supernatant and filter.

12. Ultracentrifuge the filtered supernatant. Centrifuge at 18800 rpm, 4° C. for 2 hours.

13. 24 hours after the first harvest, collect the media from the plates through a 0.22 µm Stericup filter and place at 4° C. Discard the plates.

14. Immediately following the centrifugation of the first harvest, pour off the supernatant from the bottles. Store at 4° C. overnight until harvest #2, or continue centrifuging the supernatant if harvest #2 has been collected.
15. Place the bottles back in the ultracentrifuge in the same orientation as the previous spin. Centrifuge at 18800 rpm, 4° C. for 2 hours.
16. Immediately following the second centrifugation, pour the supernatant out of the bottles and place upside down on paper towels. Aspirate media from the neck of the bottle.
17. Resuspend the virus pellets in desired cold media (e.g., X-VIVO 20, CellGro). Generally, a 50 plate prep is re-suspended into 1 mL, but discretion will need to be used based on the size of the pellet. Place the resuspension into a microcentrifuge tube on ice for 30 min.
18. Mix the re-suspended virus well and avoid forming bubbles. Check for clumps, pipette up and down at least 20 times or until homogenous.
19. Aliquot the virus into screw cap vials containing O-rings. Make 3×10 μL aliquots for testing/tittering. Place vials on ice.
20. Store the aliquots at −80° C.

Assessment of Viral Titer and Packaging Efficiency

Figure 3:
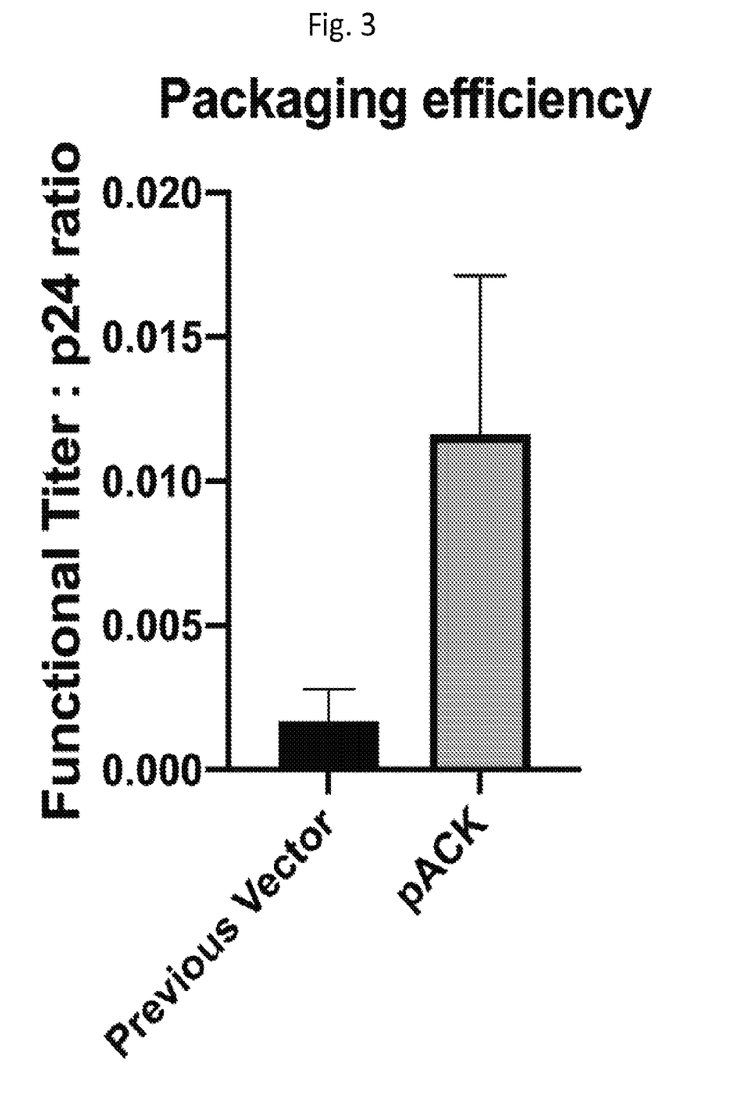
FIG. 3 is a graph depicting the increased packaging efficiency of the viral particles generated using a lentiviral backbone of the present invention as compared to those generated using a conventional lentiviral backbone.

Viral titer can be determined by methods known in the art, including, for example, by p24 capsid titer or by qPCR for integrated vector genomes. To generate the data shown in FIG. 2, vector titer was quantified using quantitative polymerase chain reaction (qPCR) to detect the Psi within the LTRs of the lentiviral backbone. In short, the Psi sequence was amplified by sequence-specific primers and detected by measurement of a fluorescently-labeled TaqMan probe. The transduced cells' viral copy number (VCN) was determined by comparison to a standard curve depicting VCNs ranging from 0.0041 copies per cell to 1.000 copy per cell. The VCN was multiplied by the lentiviral vector quantity used and the transduction day cell count to obtain the titer in integrating genomes per milliliter. In FIG. 3, the concentration of p24 capsid protein was assessed for by a sandwich ELISA assay. p24 protein is first captured on a plate using anti-p24 antibody-coated well strips. A biotinylated secondary anti-p24 antibody and streptavidin-HRP are then conjugated to the captured p24 protein. A color-producing substrate is then added, and absorbance of each well is measured using a plate reader. Quantification is achieved by comparing the end product absorbance readings with a standard curve of p24 ranging from 12.5 pg/mL to 200 pg/mL. Although this protein is commonly used to assess lentiviral titer, p24 capsid is indicative of the amount of p24 protein in a vector preparation, and does not indicate functional vector particles. Thus, the ratio of integrated vector genomes to p24 (as shown in FIG. 3) is instead a measure of the packaging efficiency of viral vectors.

We claim:

1. A lentiviral polynucleotide backbone having a sequence with at least 90% similarity to SEQ ID NO: 1, wherein the backbone comprises a multiple cloning site that allows for the insertion of a transgene of interest.

2. The lentiviral polynucleotide backbone of claim 1 further comprising a sequence encoding a self-cleaving peptide, a fluorescent protein or a marker protein.

3. The lentiviral polynucleotide backbone of claim 1, further comprising a suicide gene.

4. The lentiviral polynucleotide backbone of claim 1, wherein the polynucleotide encodes:
   (a) a self-cleaving peptide of T2A,
   (b) green fluorescent protein; or
   (c) a marker comprising CD25.

5. The lentiviral polynucleotide backbone of claim 3, wherein the suicide gene comprises tmpK.

6. The lentiviral polynucleotide backbone of claim 1, further comprising a transgene of interest inserted within the multiple cloning site.

7. The lentiviral polynucleotide backbone of claim 6, wherein the transgene of interest encodes a protein, peptide, enzyme, antibody, or siRNA.

8. The lentiviral polynucleotide backbone of claim 1, wherein the backbone comprising SEQ ID NO:1.

9. The lentiviral polynucleotide backbone of claim 1, wherein the backbone generates a population of viral particles with increased viral titer as compared to a conventional lentiviral backbone.

10. A viral particle comprising the lentiviral polynucleotide backbone of claim 1.

11. The viral particle of claim 10, wherein the viral particle is packaged with increased efficiency for a host cell as compared to those generated from a conventional lentiviral backbone.

12. A host cell comprising the lentiviral polynucleotide backbone of claim 1.

13. The host cell of claim 12, wherein the cell is a virus producer cell, and optionally wherein the cell is a stem cell or a HEK293T cell.

14. A lentiviral construct comprising a nucleic acid sequence encoding a transgene of interest inserted within the multiple cloning site of the lentiviral backbone of claim 1.

15. A virus particle comprising the lentiviral construct of claim 14.

16. A composition comprising the viral particle of claim 10.

17. A composition comprising the host cell of claim 12.

18. A kit comprising the lentiviral polynucleotide of claim 1.

* * * * *

SEQUENCE LISTING

```
<160> NUMBER OF SEQ ID NOS: 5

<210> SEQ ID NO 1
<211> LENGTH: 6678
<212> TYPE: DNA
<213> ORGANISM: Artificial Sequence
<220> FEATURE:
<223> OTHER INFORMATION: Synthetic- pACK vector

<400> SEQUENCE: 1
gatccaatgt cgacaatccc gggacgaatc aacctctgga ttacaaaatt tgtgaaagat      60
tgactggtat tcttaactat gttgctcctt ttacgctatg tggatacgct gctttaatgc     120
ctttgtatca tgctattgct tcccgtatgg ctttcatttt ctcctccttg tataaatcct     180
ggttgctgtc tctttatgag gagttgtggc ccgttgtcag gcaacgtggc gtggtgtgca     240
ctgtgtttgc tgacgcaacc cccactggtt ggggcattgc caccacctgt cagctccttt     300
ccgggacttt cgctttcccc ctccctattg ccacggcgga actcatcgcc gcctgccttg     360
cccgctgctg gacaggggct cggctgttgg gcactgacaa ttccgtggtg ttgtcgggga     420
agctgacgtc ctttccatgg ctgctcgcct gtgttgccac ctggattctg cgcgggacgt     480
ccttctgcta cgtcccttcg gccctcaatc cagcggacct tccttcccgc ggcctgctgc     540
cggctctgcg gcctcttccg cgtcttcgcc ttcgccctca gacgagtcgg atctcccttt     600
gggccgcctc cccgcctggg taccacctag aaaaacatgg agcaatcaca agtagcaata     660
cagcagctac caatgctgat tgtgcctggc tagaagcaca agaggaggag gaggtgggtt     720
ttccagtcac acctcagcta cctttaagac caatgactta caaggcagct gtagatctta     780 gccactttt aaaagaaaag gggggactgg aagggctaat tcactcccaa cgaagacaag     840
atctgctttt tgcttgtact gggtctctct ggttagacca gatctgagcc tgggagctct     900
ctggctaact agggaaccca ctgcttaagc ctcaataaag cttgccttga gtgcttcaag     960
```

```
tagtgtgtgc cgtctgttg tgtgactctg gtaactagag atccctcaga ccctttagt      1020
cagtgtggaa atctctagc agtagtagtt ctgtatttt agttattggt tactaattag      1080
acgaaggcga ataacgaag cagatatcaa ttatgggtcc cggacctagg cccgcgttgc      1140
tggcgttttt ccataggctc cgccccctg acgagcatca caaaaatcga cgctcaagtc     1200
agaggtggcg aaacccgaca ggactataaa gataccaggc gtttcccct ggaagctccc     1260
tcgtgcgctc tcctgttccg accctgccgc ttaccggata cctgtccgcc tttctccctt    1320
cgggaagcgt ggcgctttct catagctcac gctgtaggta tctcagttcg gtgtaggtcg    1380
ttcgctccaa gctgggctgt gtgcacgaac ccccgttca gcccgaccgc tgcgccttat     1440
ccggtaacta tcgtcttgag tccaacccgg taagacacga cttatcgcca ctggcagcag    1500
ccactggtaa caggattagc agagcgaggt atgtaggcgg tgctacagag ttcttgaagt    1560
ggtggcctaa ctacggctac actagaagaa cagtatttgg tatctgcgct ctgctgaagc    1620
cagttacctt cggaaaaaga gttggtagct cttgatccgg caaacaaacc accgctggta    1680
gcggtggttt ttttgtttgc aagcagcaga ttacgcgcag aaaaaaagga tctcaagaag    1740
atcctttcc tagggacaac tagtttagaa aaactcatcg agcatcaaat gaaactgcaa     1800
tttattcata tcaggattat caataccata ttttgaaaa agccgtttct gtaatgaagg     1860
agaaaactca ccgaggcagt tccataggat ggcaagatcc tggtatcggt ctgcgattcc    1920
gactcgtcca acatcaatac aacctattaa tttcccctcg tcaaaataa ggttatcaag     1980
tgagaaatca ccatgagtga cgactgaatc cggtgagaat ggcaaaagtt tatgcatttc    2040
tttccagact tgttcaacag gccagccatt acgctcgtca tcaaaatcac tcgcatcaac    2100
caaaccgtta ttcattcgtg attgcgcctg agcgagacga atacgcgat cgctgttaaa     2160
aggacaatta caaacaggaa tcgaatgcaa ccggcgcagg aacactgcca gcgcatcaac    2220
aatatttca cctgaatcag gatattcttc taatacctgg aatgctgttt tccggggat     2280
cgcagtggtg agtaaccatg catcatcagg agtacggata aaatgcttga tggtcggaag    2340
aggcataaat tccgtcagcc agtttagtct gaccatctca tctgtaacat cattggcaac    2400
gctaccttg ccatgtttca gaaacaactc tggcgcatcg gcttcccat acaagcgata     2460
gattgtcgca cctgattgcc cgacattatc gcgagcccat ttataccat ataaatcagc     2520
atccatgttg gaatttaatc gcggcctcga cgtttcccgt tgaatatggc tcataacacc    2580
ccttgtatta ctgtttatgt aagcagacag ttttattgtt catgatgata tattttatc     2640
ttgtgcaatg taacatcaga gattttgaga cacgggccag agctgcaact agtatcctaa    2700
ggcttgtctt ttgtagacgt catcctttat ttggataaac acttttgcc tggtagaatt     2760
taaatattgt ttattgcagc ttataatggt tacaaataaa gcaatagcat cacaaattc     2820
acaaataaag catttttttc actgcattct agttgtggtt tgtccaaact catcaatgta    2880
tcttatcatg tctggctcta gctatcccgc cctaactcc gcccagttcc gcccattctc     2940
cgccccatgg ctgactaatt ttttttattt atgcagaggc catttaaatt gtgggtggcc    3000
attgcatacg ttgtatccat atcataatat gtacatttat attggctcat gtccaacatt    3060
accgccatgt tgacattgat tattgactag ttattaatag taatcaatta cggggtcatt    3120
agttcatagc ccatatatgg agttccgcgt tacataactt acggtaaatg gcccgcctgg    3180
ctgaccgccc aacgaccccc gcccattgac gtcaataatg acgtatgttc ccatagtaac    3240
gccaataggg actttccatt gacgtcaatg ggtggagtat ttacggtaaa ctgcccactt    3300
ggcagtacat caagtgtatc atatgccaag tacgccccct attgacgtca atgacggtaa    3360
```

```
atggcccgcc tggcattatg cccagtacat gaccttatgg gactttccta cttggcagta    3420
catctacgta ttagtcatcg ctattaccat ggtgatgcgg ttttggcagt acatcaatgg    3480
gcgtggatag cggtttgact cacggggatt tccaagtctc cacccccattg acgtcaatgg   3540
gagtttgttt tggcaccaaa atcaacggga ctttccaaaa tgtcgtaaca actccgcccc    3600
attgacgcaa atgggcggta ggcgtgtacg gtgggaggtc tatataagca gagctcgttt    3660
agtgaaccgg ggtctctctg gttagaccag atctgagcct gggagctctc tggctaacta    3720
gggaacccac tgcttaagcc tcaataaagc ttgccttgag tgcttcaagt agtgtgtgcc    3780
cgtctgttgt gtgactctgg taactagaga tccctcagac ccttttagtc agtgtggaaa    3840
atctctagca gtggcgcccg aacagggacc tgaaagcgaa agggaaacca gagctctctc    3900
gacgcaggac tcggcttgct gaagcgcgca cggcaagagg cgaggggcgg cgactggtga    3960
gtacgccaaa aattttgact agcggaggct agaaggagag agatgggtgc gagagcgtca    4020
gtattaagcg ggggagaatt agatcgcgat gggaaaaaat tcggttaagg ccaggggaa     4080
agaaaaaata taaattaaaa catatagtat gggcaagcag ggagctagaa cgattcgcag    4140
ttaatcctgg cctgttagaa acatcagaag gctgtagaca atactggga cagctacaac    4200
catcccttca gacaggatca gaagaactta gatcattata taatacagta gcaaccctct    4260
attgtgtgca tcaaaggata gagataaaag acaccaagga agcttagac aagatagagg     4320
aagagcaaaa caaaagtaag accaccgcac agcaagcggc cgctgatctt cagacctgga    4380
ggaggagata tgagggacaa ttggagaagt gaattatata aatataaagt agtaaaaatt    4440
gaaccattag gagtagcacc caccaaggca agagaagag tggtgcagag agaaaaaaga    4500
gcagtgggaa taggagcttt gttccttggg ttcttgggag cagcaggaag cactatgggc    4560
gcagcctcaa tgacgctgac ggtacaggcc agacaattat tgtctggtat agtgcagcag    4620
cagaacaatt tgctgagggc tattgaggcg caacagcatc tgttgcaact cacagtctgg    4680
ggcatcaagc agctccaggc aagaatcctg gctgtggaaa gatacctaaa ggatcaacag    4740
ctcctgggga tttggggttg ctctggaaaa ctcatttgca ccactgctgt gccttggaat    4800
gctagttgga gtaataaatc tctggaacag attggaatca cacgacctgg atggagtggg    4860
acagagaaat taacaattac acaagcttaa tacactcctt aattgaagaa tcgcaaaacc    4920
agcaagaaaa gaatgaacaa gaattattgg aattagataa atgggcaagt ttgtggaatt    4980
ggtttaacat aacaaattgg ctgtggtata taaaattatt cataatgata gtaggaggct    5040
tggtaggttt aagaatagtt tttgctgtac tttctatagt gaatagagtt aggcagggat    5100
attcaccatt atcgtttcag acccacctcc caaccccgag gggacccgac aggcccgaag    5160
gaatagaaga agaaggtgga gagagagaca gagacagatc cattcgatta gtgaacggat    5220
ctcgacggta tcggttaact tttaaaagaa aaggggggat tggggggtac agtgcagggg    5280
aaagaatagt agacataata gcaacagaca tacaaactaa agaattacaa aaacaaatta    5340
caaaaattca aaattttatc catcacgaga ctaggctagc acgatcgact atgatcacta    5400
cgcgtacgtg gaggtgacca ggtcttaatt aagacggctc cggtgcccgt cagtgggcag    5460
agcgcacatc gcccacagtc cccgagaagt tggggggagg ggtcggcaat tgaaccggtg    5520
cctagagaag gtggcgcggg gtaaactggg aaagtgatgt cgtgtactgg ctccgccttt    5580
ttcccgaggg tggggagaa ccgtatataa gtgcagtagt cgccgtgaac gttcttttc      5640
gcaacgggtt tgccgccaga acacaggtaa gtgccgtgtg tggttcccgc gggcctggcc    5700
```

| | |
|---|---|
| tctttacggg ttatggccct tgcgtgcctt gaattacttc cacctggctg cagtacgtga | 5760 |
| ttcttgatcc cgagcttcgg gttggaagtg ggtgggagag ttcgaggcct tgcgcttaag | 5820 |
| gagccccttc gcctcgtgct tgagttgagg cctggcctgg gcgctggggc cgccgcgtgc | 5880 |
| gaatctggtg gcaccttcgc gcctgtctcg ctgctttcga taagtctcta gccatttaaa | 5940 |
| attttttgatg acctgctgcg acgctttttt tctggcaaga tagtcttgta aatgcgggcc | 6000 |
| aagatctgca cactggtatt tcggtttttg gggccgcggg cggcgacggg gcccgtgcgt | 6060 |
| cccagcgcac atgttcggcg aggcggggcc tgcgagcgcg gccaccgaga tcggacggg | 6120 |
| ggtagtctca agctggccgg cctgctctgg tgcctggcct cgcgccgccg tgtatcgccc | 6180 |
| cgccctgggc ggcaaggctg gcccggtcgg caccagttgc gtgagcggaa agatggccgc | 6240 |
| ttcccggccc tgctgcaggg agctcaaaat ggaggacgcg gcgctcggga gagcgggcgg | 6300 |
| gtgagtcacc cacacaaagg aaaagggcct ttccgtcctc agccgtcgct tcatgtgact | 6360 |
| ccacggagta ccgggcgccg tccaggcacc tcgattagtt ctcgagcttt tggagtacgt | 6420 |
| cgtctttagg ttgggggggag gggttttatg cgatggagtt tccccacact gagtgggtgg | 6480 |
| agactgaagt taggccagct tggcacttga tgtaattctc cttggaattt gccctttttg | 6540 |
| agtttggatc ttggttcatt ctcaagcctc agacagtggt tcaaagtttt tttcttccat | 6600 |
| ttcaggtgtc gtgaacctgc aggtcggaat tctcgatcga tggatctaga ccatggcgcg | 6660 |
| cctagagttt aaaccatg | 6678 |

<210> SEQ ID NO 2
<211> LENGTH: 1290
<212> TYPE: DNA
<213> ORGANISM: Homo sapiens

<400> SEQUENCE: 2

| | |
|---|---|
| atgcaacttc gaaacccaga gctccacctc ggatgtgccc ttgctctgag gttcctggcg | 60 |
| ctggtgtctt gggatatacc cggagcacgc gctctggaca cgggctggcc ccggactcca | 120 |
| accatgggtt ggctccattg ggaaaggttt atgtgcaact ggactgccag gaagaaccc | 180 |
| gactcctgta tttccgagaa actcttcatg gagatggccg agctgatggt tagcgaaggc | 240 |
| tggaaggatg ccggttatga atacttgtgt atcgacgatt gttggatggc tccccagcgg | 300 |
| gacagtgaag gacgactcca ggcagatccg caacggttcc ctcatggcat acggcagctc | 360 |
| gccaattacg tgcacagcaa gggtttgaag ctggggatat atgctgacgt gggcaacaaa | 420 |
| acctgtgctg gtttccccgg cagcttcggc tactatgata tagatgcaca aaccttcgct | 480 |
| gattggggcg tggacctgct taaatttgac ggctgttact gcgacagctt ggaaaacctc | 540 |
| gccgatggat ataaacacat gagccttgca ctcaatcgga ctggccggag cattgtctac | 600 |
| tcttgcgagt ggccattgta catgtggcct ttccagaagc taactatac ggagattaga | 660 |
| cagtattgta atcactggag aaactttgca gatatcgacg actcatggaa gtccatcaaa | 720 |
| tctattctgg actggacttc attcaatcag gagcgcatcg tcgatgttgc cggtccaggt | 780 |
| ggatggaacg accctgacat gctcgtaatt gggaatttcg gactgtcctg gaatcagcag | 840 |
| gtcacacaga tggctttgtg ggctatcatg gcagccccac tctttatgtc taacgatttg | 900 |
| cggcatattt caccacaggc caaagccctg ctgcaagata aggacgtcat agcgattaac | 960 |
| caggaccccac tggaaagca gggctaccag ctgagacagg gcgacaattt tgaggtctgg | 1020 |
| gaaagacctc ttagcgggct ggcgtgggcc gtagccatga ttaatcgcca ggaaattggc | 1080 |
| ggccctcgct cttacactat cgcggtcgcc agtctgggca agggagtcgc ttgtaacccc | 1140 |

| | | |
|---|---|---|
| gcctgcttca taactcagtt gctgcccgtg aaacggaagc tgggcttcta tgaatggact | | 1200 |
| agcagactcc gcagtcatat taatccgact ggtacggtgc tgctgcaact ggagaatacc | | 1260 |
| atgcagatgt cacttaagga tcttctgtga | | 1290 |

<210> SEQ ID NO 3
<211> LENGTH: 1611
<212> TYPE: DNA
<213> ORGANISM: Homo sapiens

<400> SEQUENCE: 3

| | | |
|---|---|---|
| atggagttct caagcccctc tcgggaagaa tgcccaaaac ctctgtcacg ggtgtctatc | | 60 |
| atggctggat cactgactgg cctgctgctg ctgcaggccg tgagctgggc ctccggagcc | | 120 |
| cggccttgca tcccaaagtc tttcggctac agctccgtgg tgtgcgtgtg caacgccacc | | 180 |
| tattgtgact ccttcgatcc ccctaccttt cccgccctgg gcacattttc tcggtacgag | | 240 |
| tctacacgca gcggcaggag aatggagctg agcatgggcc ctatccaggc caatcacacc | | 300 |
| ggaacaggcc tgctgctgac cctgcagcca gagcagaagt tccagaaggt gaagggcttt | | 360 |
| ggaggagcaa tgacagacgc agccgccctg aacatcctgg ccctgtcccc acccgcccag | | 420 |
| aatctgctgc tgaagtccta cttctctgag gagggcatcg gctataacat catcagggtg | | 480 |
| cccatggcca gctgcgactt ttccatcaga acctacacat gccgatac ccctgacgat | | 540 |
| ttccagctgc acaattttc cctgccagag gaggatacaa agctgaagat cccactgatc | | 600 |
| cacagggccc tgcagctggc ccagaggccc gtgagcctgc tggccagccc ctggacctcc | | 660 |
| cctacatggc tgaagaccaa cggcgccgtg aatggcaagg gctctctgaa gggacagcca | | 720 |
| ggcgacatct accaccagac atgggcccgc tatttcgtga agtttctgga tgcctacgcc | | 780 |
| gagcacaagc tgcagttctg gggccgtgacc gcagagaacg agccttctgc cggcctgctg | | 840 |
| agcggctatc ccttccagtg cctgggcttt acacctgagc accagaggga ctttatcgcc | | 900 |
| agagatctgg gcccaaccct ggccaactcc acacaccaca atgtgcggct gctgatgctg | | 960 |
| gacgatcagc gcctgctgct gcctcactgg gccaaggtgg tgctgaccga cccagaggcc | | 1020 |
| gccaagtacg tgcacggcat cgccgtgcac tggtatctgg atttcctggc accagcaaag | | 1080 |
| gccaccctgg gagagacaca caggctgttc cctaacacca tgctgtttgc cagcgaggcc | | 1140 |
| tgcgtgggct ccaagttttg ggagcagtcc gtgcggctgg gctcttggga caggggcatg | | 1200 |
| cagtactccc actctatcat caccaatctg ctgtatcacg tggtgggctg gacagactgg | | 1260 |
| aacctggccc tgaatccaga gggcggcccc aactgggtga gaaatttcgt ggatagcccc | | 1320 |
| atcatcgtgg acatcaccaa ggatacattc tacaagcagc caatgttta tcacctgggc | | 1380 |
| cacttctcta gtttatccc agagggcagc cagagggtgg gcctggtggc cagccagaag | | 1440 |
| aacgacctgg atgcagtggc cctgatgcac cctgacggct ccgccgtggt ggtggtgctg | | 1500 |
| aatcgctcta gcaaggacgt gcctctgacc atcaaggacc ccgccgtggg ctttctggag | | 1560 |
| accatttcac ccggctattc tattcatacc tatctgtgga ggaggcagta a | | 1611 |

<210> SEQ ID NO 4
<211> LENGTH: 1188
<212> TYPE: DNA
<213> ORGANISM: Homo sapiens

<400> SEQUENCE: 4

| | | |
|---|---|---|
| atgccgggcc ggagttgcgt cgccttagtc ctcctggctg ccgccgtcag ctgtgccgtc | | 60 |

```
gcgcagcacg cgccgccgtg acagaggac tgcagaaaat caacctatcc tccttcagga      120
ccaacgtaca gaggtgcagt tccatggtac accataaatc ttgacttacc accctacaaa    180
agatggcatg aattgatgct tgacaaggca ccagtgctaa aggttatagt gaattctctg    240
aagaatatga taaatacatt cgtgccaagt ggaaaaatta tgcaggtggt ggatgaaaaa    300
ttgcctggcc tacttggcaa ctttcctggc ccttttgaag aggaaatgaa gggtattgcc    360
gctgttactg atatacccttt aggagagatt atttcattca atattttta tgaattattt    420 accatttgta cttcaatagt agcagaagac aaaaaaggtc atctaataca tgggagaaac    480
atggattttg gagtatttct tgggtggaac ataaataatg atacctgggt cataactgag    540
caactaaaac ctttaacagt gaatttggat ttccaaagaa acaacaaaac tgtcttcaag    600
gcttcaagct tgctggcta tgtgggcatg ttaacaggat tcaaaccagg actgttcagt    660
cttacactga atgaacgttt cagtataaat ggtggttatc tgggtattct agaatggatt    720
ctgggaaaga aagatgtcat gtggataggg ttcctcacta gaacagttct ggaaaatagc    780
acaagttatg aagaagccaa gaattattg accaagacca gatattggc cccagcctac     840 tttatcctgg gaggcaacca gtctgggaa ggttgtgtga ttacacgaga cagaaaggaa    900
tcattggatg tatatgaact cgatgctaag cagggtagag ggtatgtggt acaaacaaat    960
tatgaccgtt ggaaacatcc cttcttcctt gatgatcgca gaacgcctgc aaagatgtgt   1020
ctgaaccgca ccagccaaga gaatatctca tttgaaacca tgtatgatgt cctgtcaaca   1080
aaacctgtcc tcaacaagct gaccgtatac acaaccttga tagatgttac caaaggtcaa   1140
ttcgaaactt acctgcggga ctgccctgac ccttgtatag gttggtga                1188
```

<210> SEQ ID NO 5
<211> LENGTH: 2859
<212> TYPE: DNA
<213> ORGANISM: Homo sapiens

<400> SEQUENCE: 5

```
atgggcgtga ggcacccccc ttgctctcac aggctgctgg ccgtgtgcgc actggtgagc    60
ctggccaccg ccgccctgct gggccacatc ctgctgcacg acttcctgct ggtgcccagg    120
gagctgtccg gcagctcccc agtgctggag gagacccacc cagcacacca gcagggcgcc   180
tctcggccag gccccgcga tgcacaggca caccccaggcc ggccccgcgc cgtgccaacc    240
cagtgcgacg tgccacccaa cagccggttt gactgtgccc ccgataaggc catcacacag   300
gagcagtgcg aggccagggg ctgctgttat atccctgcaa agcagggcct ccagggcgcc   360
cagatgggac agccatggtg ttctctttcct ccatcttacc ccagctataa gctggagaat    420
ctgtctagct ccgagatggg ctacacagcc accctgacaa gaaccacacc aacattcttt    480
cccaaggaca tcctgaccct gcggctggac gtgatgatgg agacagagaa ccgcctgcac   540
ttcaccatca aggaccccgc caataggaga tatgaggtgc ctctggagac ccacacgtg   600 cactctcggg ccctagcccc actgtactcc gtggagttct ctgaggagcc atttggcgtg   660
atcgtgcggc gccagctgga tggacgcgtg ctgctgaaca ccacagtggc ccccctgttc    720
tttgccgacc agttcctcca gctgagcaca tccctgccct ccagtatat caccggcctg   780 gccgagcacc tgtctcctct gatgctgtct accagctgga caaggatcac cctgtggaac    840
agagacctgg caccaacccc tggcgcaaat ctgtacggca gccacccttt ctatctggcc   900
ctggaggatg gaggctccgc ccacggcgtg tttctgctga actctaatgc catggacgtg    960
gtgctccagc caagccccgc cctgtcctgg cggtctaccg gcggcatcct ggacgtgtac   1020
```

```
atcttcctgg gccctgagcc aaagtccgtg gtgcagcagt acctggacgt ggtgggctat    1080
cctttcatgc cccttactg gggactggga tttcacctgt gccgctgggg ctattctagc    1140
acagccatca cccggcaggt ggtggagaac atgacccgcg cccactttcc actggatgtg    1200
cagtggaatg acctggatta catggactcc aggagagact tcaccttcaa caaggacggc    1260
ttcagggatt ttcccgccat ggtgcaggag ctgcaccagg gcggccggcg ctacatgatg    1320
atcgtggacc ccgccatctc ctctagcgga cctgccggca gctacagacc atatgacgag    1380
ggcctgagga gaggcgtgtt catcacaaac gagaccggcc agcctctgat cggcaaggtc    1440
tggccaggct ccaccgcctt cccagacttc accaatccaa ccgccctggc ctggtgggag    1500
gacatggtgg ccgagttcca cgaccaggtg cctttgatg gcatgtggat cgacatgaac    1560
gagccatcta atttcatcag ggcagcgag acggctgcc ccaacaatga gctggagaac    1620
ccaccatatg tgcctggcgt ggtgggaggc accctccagg cagcaaccat ctgtgcctcc    1680
tctcaccagt ttctgtctac acactataac ctgcacaatc tgtacggact gaccgaggca    1740
atcgccagcc acagagccct ggtgaaggcc aggggcacaa gacctttcgt gatctccagg    1800
tctacctttg ccggacacgg cagatacgca ggacactgga ccggcgacgt gtggagcagc    1860
tgggagcagc tggcctctag cgtgccagag atcctccagt tcaacctgct gggcgtgccc    1920
ctggtgggag cagacgtgtg cggctttctg ggcaatacat ccgaggagct gtgcgtgagg    1980
tggacccagc tgggagcctt ctatcccttc atgcgcaacc acaatagcct gctgtccctg    2040
cctcaggagc catacagctt ctccgagcct gcacagcagg caatgaggaa ggccctgaca    2100
ctgcgctatg ccctgctgcc acacctgtac accctgtttc accaggcaca cgtggcagga    2160
gagacagtgg cccggcccct gttcctggag tttcctaagg attcctctac ctggacagtg    2220
gaccaccagc tgctgtgggg agaggccctg ctgatcaccc ccgtgctcca ggcaggcaag    2280
gcagaggtga caggctattt ccctctgggc acatggtacg acctccagac cgtgccagtg    2340
gaggccctgg gcagcctgcc tccaccacct gccgccccc gcgagcctgc catccactcc    2400
gagggacagt gggtgacact gccagcacct ctggacacca tcaacgtgca cctgagggcc    2460
ggctatatca tccccctcca gggccctggc ctgaccacaa ccgagtccag acagcagcca    2520
atggccctgg ccgtggccct gaccaaggga ggcgaggcca ggggcgagct gttctgggac    2580
gatggcgagt ctctggaggt gctggagaga ggcgcctaca cacaggtcat cttcctggcc    2640
aggaacaata caatcgtgaa tgagctggtg agagtgaccc tgagggagc aggactccag    2700 ctccagaagg tgacagtgct gggagtggca accgcaccac agcaggtgct gagcaacggc    2760
gtgcccgtga gcaatttcac atactcccct gataccaagg tgctggacat ctgcgtgagc    2820
ctgctgatgg gcgagcagtt tctggtgtcc tggtgttga                          2859
```